United States Patent
Wu

(10) Patent No.: US 8,615,230 B2
(45) Date of Patent: *Dec. 24, 2013

(54) METHOD OF REPORTING RADIO ACCESS TECHNOLOGY CAPABILITY AND RELATED APPARATUS

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 488 days.

This patent is subject to a terminal disclaimer.

(21) Appl. No.: 12/628,236

(22) Filed: Dec. 1, 2009

(65) Prior Publication Data

US 2010/0159919 A1 Jun. 24, 2010

Related U.S. Application Data

(60) Provisional application No. 61/138,951, filed on Dec. 19, 2008.

(51) Int. Cl.
*H04W 24/00* (2009.01)
*H04W 4/00* (2009.01)

(52) U.S. Cl.
USPC .................. 455/424; 455/435.1

(58) Field of Classification Search
USPC .......... 455/423–425, 436–448, 432.1, 435.1; 370/331, 328, 338
See application file for complete search history.

(56) References Cited

U.S. PATENT DOCUMENTS

| | | | |
|---|---|---|---|
| 8,126,461 B2 * | 2/2012 | Sengupta et al. | 455/435.2 |
| 8,264,979 B2 * | 9/2012 | Wu | 370/252 |
| 2004/0147242 A1 | 7/2004 | Pasanen | |
| 2005/0073977 A1 * | 4/2005 | Vanghi et al. | 370/335 |
| 2007/0224990 A1 * | 9/2007 | Edge et al. | 455/436 |
| 2008/0102832 A1 | 5/2008 | Sengupta | |
| 2008/0181178 A1 * | 7/2008 | Shaheen | 370/331 |
| 2008/0318565 A1 * | 12/2008 | Stojanovski et al. | 455/422.1 |
| 2009/0046596 A1 * | 2/2009 | Ewe et al. | 370/252 |
| 2009/0170426 A1 * | 7/2009 | Jung et al. | 455/7 |
| 2009/0207805 A1 * | 8/2009 | Zou | 370/331 |
| 2009/0305671 A1 * | 12/2009 | Luft et al. | 455/411 |
| 2012/0099452 A1 * | 4/2012 | Dai et al. | 370/252 |

FOREIGN PATENT DOCUMENTS

| | | |
|---|---|---|
| TW | I258954 | 7/2006 |
| WO | 2004004407 A1 | 1/2004 |
| WO | 2005039201 A2 | 4/2005 |
| WO | 2008018130 A1 | 2/2008 |

OTHER PUBLICATIONS

Ericsson: "Proposed changes to the RRC protocol specification regarding RRC connection establishment and re-establishment procedures", TSG-RAN Working Group 2 (Radio layer 2 and Radio layer 3), TSGR2#4 (99)417, May 25-28, 1999, XP050112770, Berlin, Germany.

(Continued)

*Primary Examiner* — Brandon Miller
(74) *Attorney, Agent, or Firm* — Winston Hsu; Scott Margo

(57) ABSTRACT

A method of reporting RAT capability for a mobile device of a wireless communication system includes including capability information only associated with a first RAT in a capability reporting message of the first RAT, and transmitting the capability reporting message to a network of a second RAT via the second RAT.

24 Claims, 7 Drawing Sheets

(56) References Cited

OTHER PUBLICATIONS

Universal Mobile Telecommunications System (UMTS); RRC Protocol Specification (3G TS 25.331 version 3.1.0 Release 1999), ETSI TS 125 331 V3.1.0 (Jan. 2000), front page+pp. 1-282, XP002165164, European Telecommunications Standards Institute (ETSI), Sophia Antipolis, Valbonne France.

Vodafone: "UE capability handling in LTE/SAE", 3GPP TSG-SA 2 Meeting #65/64b, S2-084434, May 7-16, 2008, XP050266600, Munich and Prague.

3rd Generation Partnership Project; Technical Specification Group Radio Access Network; Evolved Universal Terrestrial Radio Access (E-UTRA) Radio Resource Control (RRC); Protocol specification (Release 8), 3GPP TS 36.331 V8.3.0 (Sep. 2008), pp. 1,46-47,66,76-79,164,168 , XP002565976, European Telecommunications Standards Institute (ETSI), Sophia Antipolis, Valbonne France.

Digital cellular telecommunications system (Phase 2+); Mobile radio interface layer 3 specification, Radio Resource Control (RRC) protocol; Iu mode (3GPP TS 44.118 version 7.2.0 Release 7), ETSI TS 144 118 V7.2.0 (Jun. 2007), front page+pp. 1-355, XP014038555, European Telecommunications Standards Institute (ETSI), Sophia Antipolis, France.

3GPP TS 25.331 V8.4.0 Radio Resource Control (RRC), Sep. 2008.
3GPP TS 24.008 V8.3.0 Mobile radio interface Layer 3 specification; Core network protocols; Stage 3, Sep. 2008.
3GPP TSG-RAN2#64 meeting R2-087451, Nov. 2008.
Office action mailed on Jan. 7, 2013 for the Taiwan application No. 098142478, filed Dec. 11, 2009, p. 1-9.

* cited by examiner

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Attach complete message identity | Message type 10.4 | M | V | 1 |
| 27 | Inter RAT handover information | Inter RAT information container 10.5.5.24 | O | TLV | 3-40 |
| | UE Capability information | UE Capability information container | O | TLV | 3-40 |

FIG. 6

| IEI | Information Element | Type/Reference | Presence | Format | Length |
|---|---|---|---|---|---|
| | Protocol discriminator | Protocol discriminator 10.2 | M | V | 1/2 |
| | Skip indicator | Skip indicator 10.3.1 | M | V | 1/2 |
| | Routing area update complete message identity | Message type 10.4 | M | V | 1 |
| 26 | List of Receive N-PDU Numbers | Receive N-PDU Number list 10.5.5.11 | O | TLV | 4-19 |
| 27 | Inter RAT handover information | Inter RAT information container 10.5.5.24 | O | TLV | 3-40 |
| | UE Capability information | UE Capability information container | O | TLV | 3-40 |

FIG. 7

METHOD OF REPORTING RADIO ACCESS TECHNOLOGY CAPABILITY AND RELATED APPARATUS

CROSS REFERENCE TO RELATED APPLICATIONS

This application claims the benefit of U.S. Provisional Application No. 61/138,951, filed on Dec. 19, 2008 and entitled "Method of selecting RAT capability to transmit in wireless communications system and related communication device" the contents of which are incorporated herein.

BACKGROUND OF THE INVENTION

1. Field of the Invention

The present invention relates to a method and related communication device used in a wireless communication system and more particularly, to a method of reporting radio access technology (RAT) capability in a wireless communication system and related communication device.

2. Description of the Prior Art

A long-term evolution (LTE) system, initiated by the third generation partnership project (3GPP), is now being regarded as an evolved 3G (third generation) radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile devices, also referred as user equipments (UEs).

A UE equipped with a multi-mode capability supports RATs (Radio Access Technologies) in addition to the LTE RAT and has corresponding RAT capability information. A UE capability transfer procedure used in the LTE system allows the UE to report RAT capability information to the E-UTRAN by sending a UECapabilityInformation message. With the RAT capability information, the E-UTRAN performs resource/mobility management for the UE, e.g. initiating an inter-RAT handover.

When a UE supporting the LTE uses other RATs, such as GSM (Global System for Mobile communications) or UMTS (Universal Mobile Telecommunications System), the UE can be required to report LTE capability to the corresponding radio access network, such as a GERAN (GSM/EDEG Radio Access Network) or a UTRAN (UMTS Terrestrial Radio Access Network). According to the prior art, the UE also needs to send the abovementioned UECapabilityInformation message that is allowed to include capabilities of various RATs including the GSM/UMTS/LTE/CDMA2000 (Code Division Multiple Access 2000). The UE can always send the UECapabilityInformation message including the LTE and other RATs, thereby resulting in a large size of the UECapabilityInformation message. In addition, the capability information of the RATs other than the LTE in the UECapabilityInformation message is unnecessary if the capabilities of other RATs have just been reported through another procedure/message.

For example, the UECapabilityInformation message is sent by a UE accessing a UTRAN for reporting the LTE, CDMA2000, and UMTS capabilities. However, no interworking between UTRAN and CDMA2000 is specified. Thus, the CDMA2000 capability information is unnecessary. In addition, the UMTS has specified a UE capability transfer procedure for the UE to report the GERAN/UMTS capability. In this situation, the UMTS capability information in the UECapabilityInformation message is unnecessary. In the UMTS system, the UE is able to report all supported RAT capabilities through a RRC CONNECTION SETUP COMPLETE message of a RRC connection establishment procedure. In the prior art, the RRC CONNECTION SETUP COMPLETE message can include the GERAN/UMTS capability information and the UECapabilityInformation message that also includes the GERAN/UMTS capability information in addition to the LTE capability information. As can be seen, duplication of the GERAN/UMTS capability information is made, resulting in a large size of the RRC CONNECTION SETUP COMPLETE message. This downgrades delays completion of RRC connection establishment procedure and thereby downgrades system performance.

In addition, the prior art does not specify how the UE can report the E-UTRA capability to a core network communicating with the UE in a NAS (Non-Access Stratum) level. Without the E-UTRA capability, the core network cannot initiate a handover for the UE if the UE only support the PS domain. For example, if a UE only supports GPRS (General packet radio service) and does not support GSM (for CS services), a handover from the GERAN to the E-UTRAN for the UE cannot be initiated since the UE cannot use NAS messages to send the E-UTRA capability to a SGSN (Serving GPRS Support Node).

SUMMARY OF THE INVENTION

Therefore, the present invention provides a method of reporting radio access capability in a wireless communication system and related communication device to eliminate unnecessary capability reporting and provide a core network with capability information for handover preparation.

According to one aspect of the present invention, a method of reporting RAT capability for a mobile device of a wireless communication system includes including capability information only associated with a first RAT in a capability reporting message, and transmitting the capability reporting message to a network of a second RAT via the second RAT.

According to another aspect of the present invention, a method of reporting RAT capability for a mobile device of a wireless communication system includes receiving a first NAS message requesting capability of a first RAT via a second RAT, and sending a second NAS message including capability information associated with the first RAT via the second RAT in response to the first NAS message, where the first NAS message and the second NAS message belong to a packet switched domain.

According to another aspect of the present invention, a communication device of a wireless communication system for accurately reporting RAT capability includes means for including capability information only associated with a first RAT in a capability reporting message, and means for transmitting the capability reporting message to a network of a second RAT via the second RAT.

According to another aspect of the present invention, a communication device of a wireless communication system for accurately reporting RAT capability includes means for receiving a first NAS message requesting capability of a first RAT via a second RAT, and means for sending a second NAS message including capability information associated with the first RAT via the second RAT in response to the first NAS message, where the first NAS message and the second NAS message belong to a packet switched domain.

These and other objectives of the present invention will no doubt become obvious to those of ordinary skill in the art after reading the following detailed description of the preferred example that is illustrated in the various figures and drawings.

BRIEF DESCRIPTION OF THE DRAWINGS

FIG. 6 is an example of the NAS message for reporting E-UTRA capability.

FIG. 7 is an example of the NAS message for reporting E-UTRA capability.

DETAILED DESCRIPTION

Figure 1:
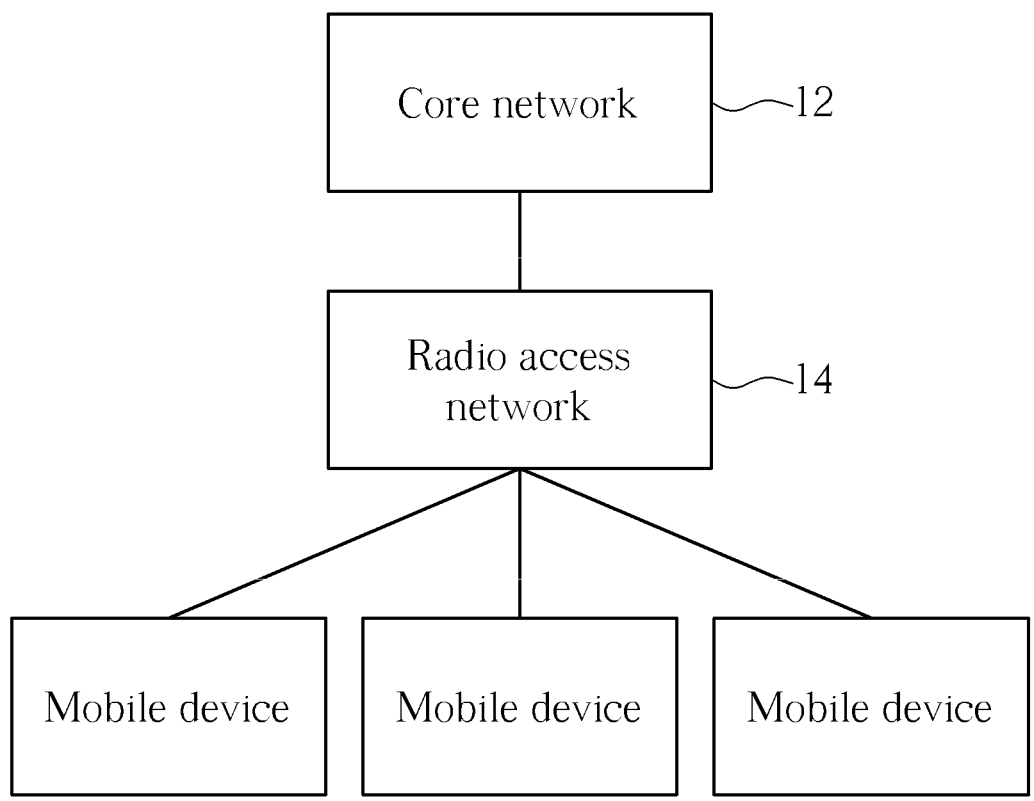
FIG. 1 is a schematic diagram of a wireless communication system.

Please refer to FIG. 1, which illustrates a schematic diagram of a wireless communication system 10 according to an example of the present invention. Briefly, the wireless communication system 10 includes a core network 12, a radio access network 14 and a plurality of mobile devices. The radio access network 14 can be a second generation (2G) network, e.g. a GERAN (GSM/EDEG Radio Access Network), or a third generation (3G) network other than an evolved 3G network, e.g. UTRAN (UMTS Radio Access Network). The evolved 3G network can be seen as LTE network or further release version network. The mobile devices can be devices such as mobile phones, computer systems, etc, supporting multi-radio-access technologies (RATs) including the GSM/GPRS (General Packet Radio Service)/UMTS/LTE (Long Term Evolution). Since the mobile devices support multi-RATs, capability information associated with the supported RATs is stored in the mobile devices. The capability information can be reported to the radio access network 14 or the core network 12 for resource/inter-RAT arrangement. The mobile device communicates with the core network 12 via NAS (Non-Access Stratum) messages, and communicates with the radio access network 14 via RRC (Radio Resource Control) messages.

Figure 2:
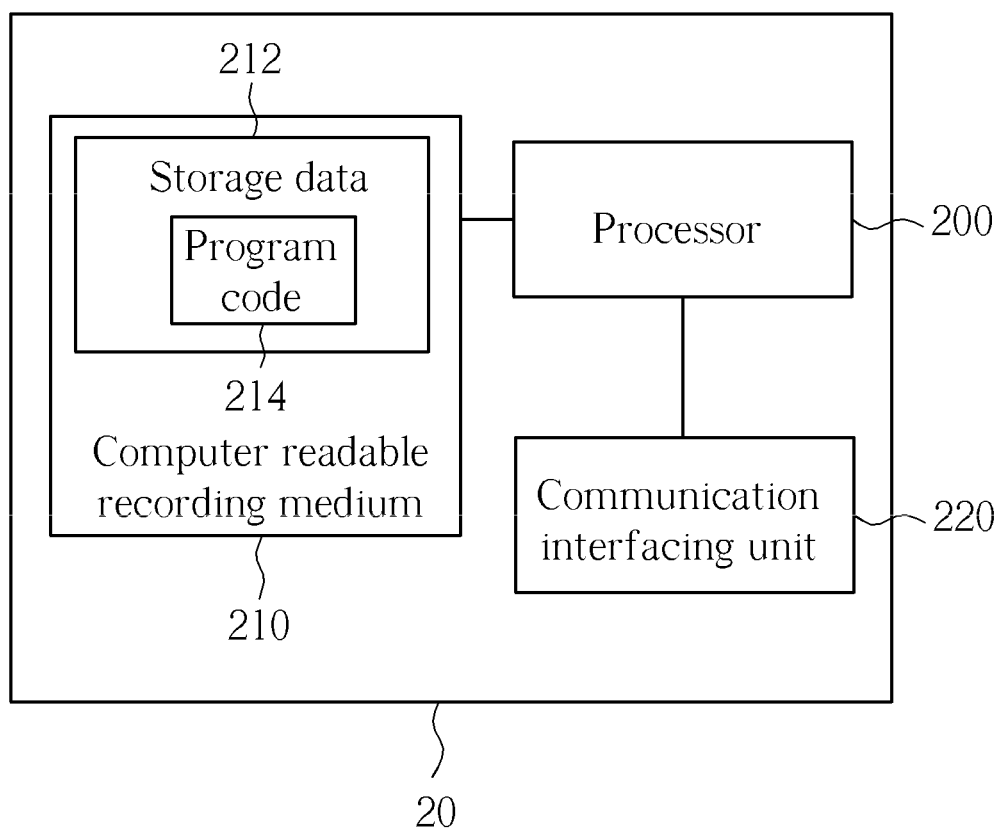
FIG. 2 is a schematic diagram of a communication device according to an example of the present invention.

Please refer to FIG. 2, which illustrates a schematic diagram of a communication device 20 according to an example of the present invention. The communication device 20 can be the mobile devices shown in FIG. 1 and includes a processor 200, a computer readable recording medium 210 and a communication interfacing unit 220. The computer readable recording medium 210 is any data storage device that includes program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The communication interfacing unit 220 is preferably a radio transceiver and accordingly exchanges wireless signals with the network according to processing results of the processor 200.

Figure 3:
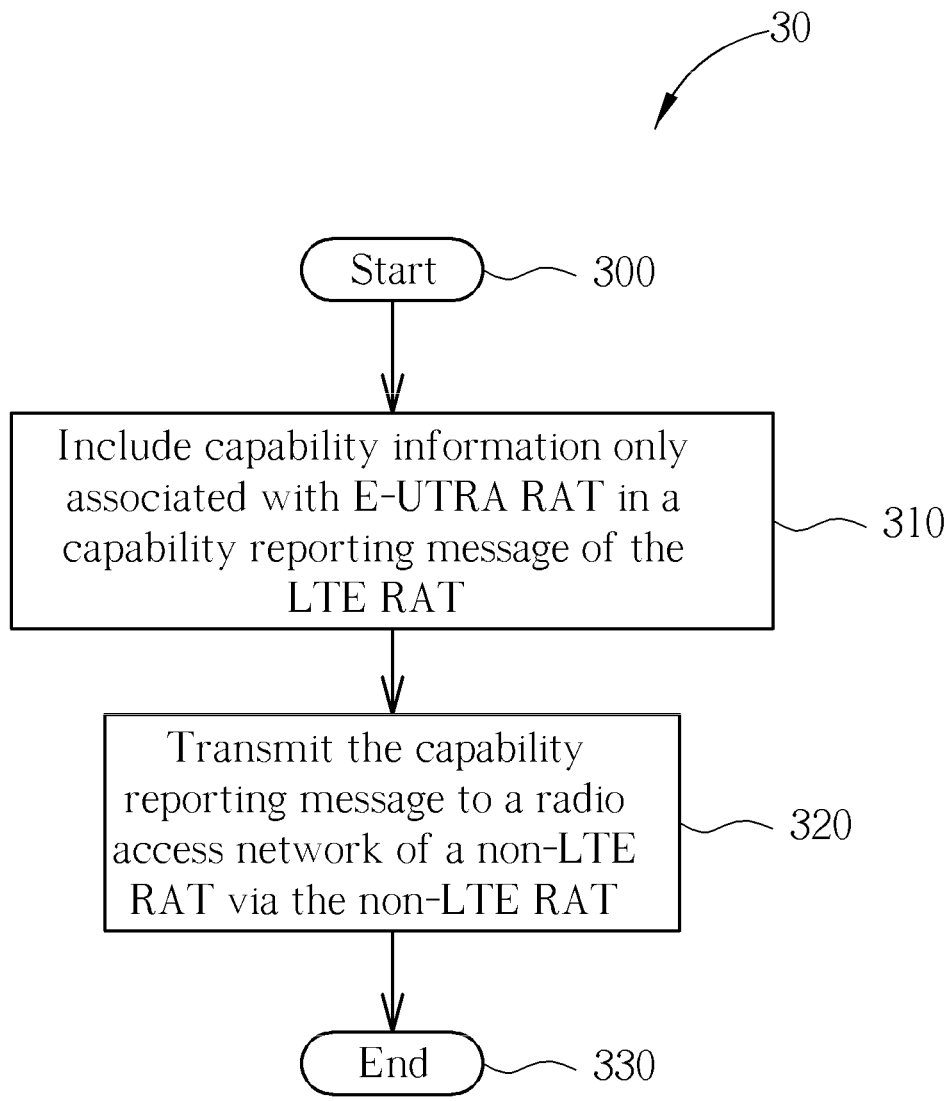
FIG. 3 is a flowchart of a process according to an example of the present invention.

When the communication device 20 supporting the LTE RAT communicates with a network (a radio access network or a core network) via a non-LTE RAT, processes described below are provided for reporting the LTE RAT capability to allow the network using the non-LTE RAT to obtain the E-UTRA (Evolved UMTS Terrestrial Radio Access) capability seen as LTE RAT capability. Please refer to FIG. 3, which illustrates a flowchart of a process 30 according to an example of the present invention. The process 30 is utilized for reporting LTE RAT capability at a RRC level for a mobile device. The process 30 can be compiled into the program code 214 and includes the following steps:

Step 300: Start.

Step 310: Include capability information only associated with E-UTRA RAT in a capability reporting message of the LTE RAT.

Step 320: Transmit the capability reporting message to a radio access network of a non-LTE RAT via the non-LTE RAT.

Step 330: End.

According to the process 30, the mobile device operating with the non-LTE RAT transmits the capability reporting message that includes no capability information but the E-UTRA capability information to the radio access network via the non-LTE RAT. In other words, the mobile device does not include any capability information associated with the non-LTE RAT in the capability reporting message. Therefore, a size of the capability reporting message is limited so that execution efficiency of the capability enquiring procedure is improved.

To further consider capability reporting flexibility, the mobile device can include capability information associated with the non-LTE RAT in the capability reporting message when receiving signaling indicating the non-LTE RAT from the network. The network can form and send the signaling in broadcast or dedicated message.

In addition, after the mobile device transmits the capability reporting message to the non-LTE radio access network, the E-UTRA capability information is transferred to an eNodeB. Based on the E-UTRA capability information, the eNodeB can properly initiate an inter-RAT handover from the non-LTE to the LTE radio access network. After the handover is performed successfully, the eNodeB can transmit signaling indicating non-LTE RATs, and the mobile device accordingly reports corresponding non-LTE capabilities.

Furthermore, the mobile device may generate the capability reporting message when a capability enquiring procedure used in the non-LTE RAT is initiated. The capability reporting message may be a UECapabilityInformation message used in a RRC layer of the LTE system. The capability enquiring procedure may be a UE capability information procedure or a RRC establishment procedure. In the RRC connection establishment procedure, the UECapabilityInformation message is encapsulated in a RRC CONNECTION SETUP COMPLETE message, and then the RRC CONNECTION SETUP COMPLETE message is sent to the radio access network. In the UE capability information procedure, the UECapabilityInformation message is encapsulated in a UE CAPABILITY INFORMATION message responding to a UE CAPABILITY ENQUIRY message received from the radio access network (e.g. the UTRAN). And the UE CAPABILITY INFORMATION message is then sent to the radio access network.

Taking an example, a mobile device supporting the LTE, GSM, UMTS, and CDMA2000 (Code Division Multiplexing Access 2000) needs to send the UECapabilityInformation message in RATs other than LTE (e.g. GSM/UMTS). According to the process 30, the mobile device includes the E-UTRA capability information in the UECapabilityInformation message and does not include GSM, UMTS or CDMA2000 capabilities. The network can prepare a handover to the LTE system or manage mobility for the mobile device in accordance with the E-UTRA capability information. However, the mobile device is allowed to include the GSM/UMTS/CDMA2000 capability in the UECapabilityInformation message if receiving signaling indicating the GSM/UMTS/CDMA2000 RAT before the generation of the UECapabilityInformation message.

In another example, the capability reporting message is a RRC CONNECTION SETUP COMPLETE message or UE CAPABILITY INFORMATION message used in a RRC layer of UMTS system. In other words, the abovementioned message encapsulating step can be omitted. In the RRC connection establishment procedure, the E-UTRA capability information is encapsulated in a RRC CONNECTION SETUP COMPLETE message, and then the RRC CONNECTION SETUP COMPLETE message is sent to the UTRAN. In the UE capability information procedure, the E-UTRA capability information is encapsulated in a UE CAPABILITY INFORMATION message responding to a UE CAPABILITY ENQUIRY message received from the UTRAN. And the UE CAPABILITY INFORMATION message is then sent to the UTRAN.

Figure 4:
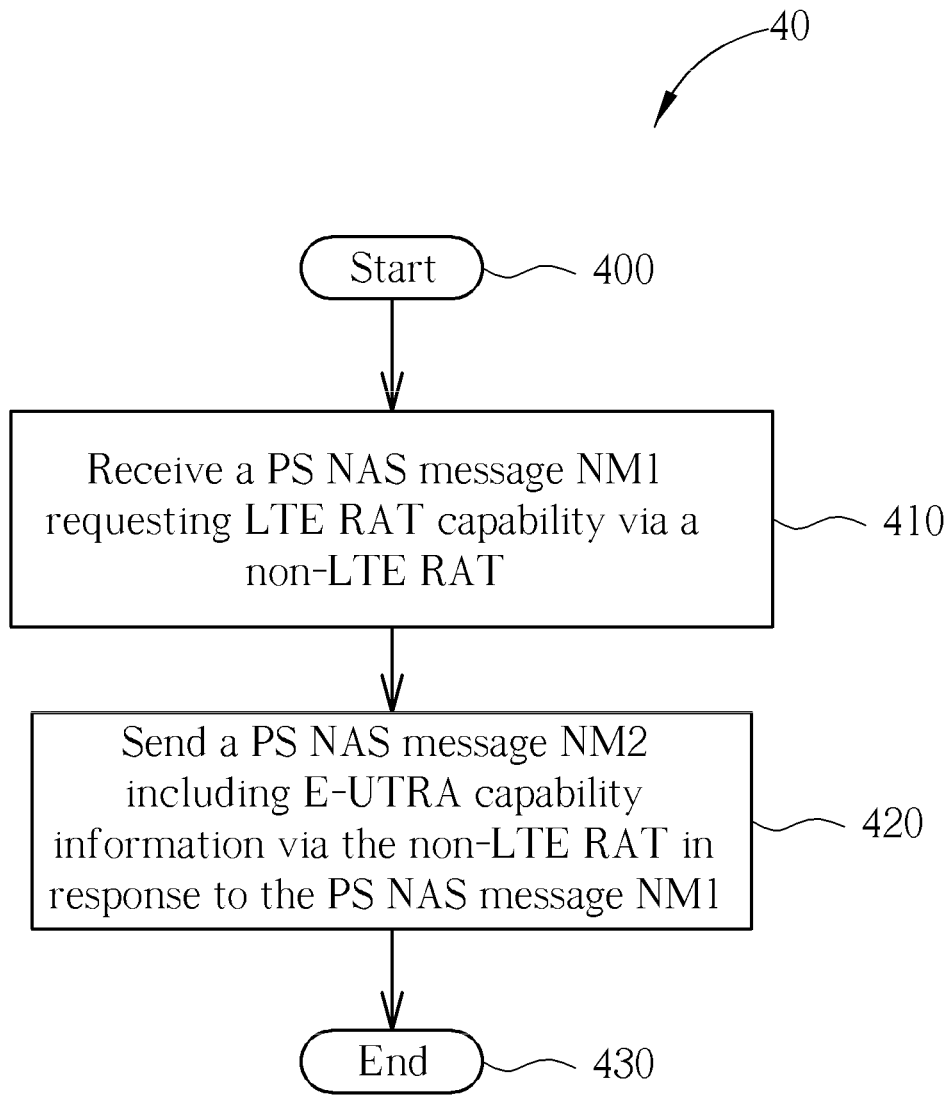
FIG. 4 is a flowchart of a process according to an example of the present invention.

Please refer to FIG. 4, which illustrates a flowchart of a process 40 according to an example of the present invention. The process 40 is utilized for reporting LTE RAT capability at a NAS level for a mobile device. The process 40 can be compiled into the program code 214 and includes the following steps:

Step 400: Start.

Step 410: Receive a PS (Packet Switched) NAS message (hereinafter called NM1 for convenience) requesting LTE RAT capability via a non-LTE RAT.

Step 420: Send a PS NAS message (hereinafter called NM2 for convenience) including E-UTRA capability information via the non-LTE RAT in response to the PS NAS message NM1.

Step 430: End.

According to the process 40, the mobile device operating with the non-LTE RAT sends the PS NAS message NM2 including the E-UTRA capability information in response to the received PS NAS message NM1 requesting the LTE RAT capability. The PS NAS messages NM1 and NM2 are NAS messages used for transferring information of the PS domain. With the process 40, the UE is able to report LTE RAT capability to the core network that can determine whether/how to prepare an inter-RAT handover based on the reported LTE RAT capability. In addition, the UE does not spontaneously transmit the E-UTRA capability information without the receipt of a PS NAS message requesting the LTE RAT capability.

Figure 5:
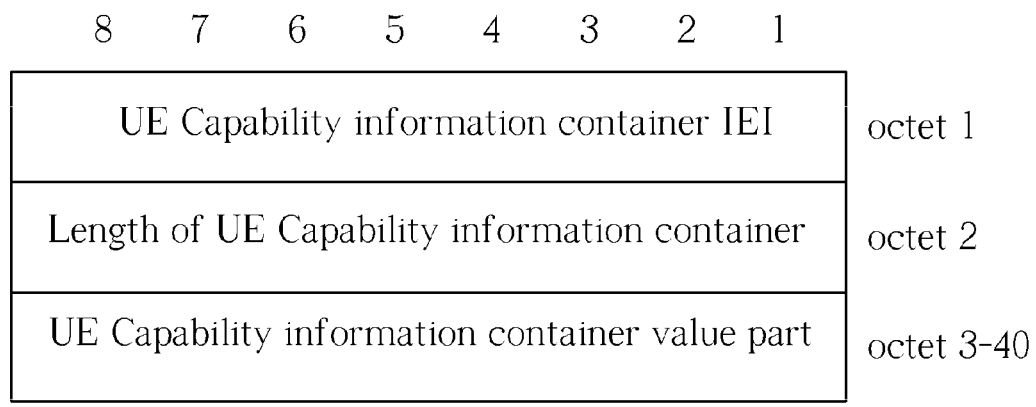
FIG. 5 is illustrates an example of a transmission format including E-UTRA capability.

The PS NAS message NM1 may include a "Requested MS information" information element (IE) of the GPRS RAT, including a predetermined bit set to a predetermined value. The predetermined bit may be an I-RAT bit or one of three spare bits in the "Requested MS information" IE, and accordingly the predetermined value is 1. In this situation, the core network determines that the mobile device requests an inter-RAT information container IE. The E-UTRA capability information may be a UECapabilityInformation message that is an RRC message of the LTE system. Please refer to FIG. 5, which illustrates an example of a transmission format including the UECapabilityInformation message or E-UTRA capability information element. In FIG. 5, the transmission format includes an UE Capability information container information element identity (IEI), a length indication field of UE Capability information container, and a UE Capability information container value part. The UE Capability information container IEI is used for the core network to know that the received message is the E-UTRA capability information. The UE Capability information container value part is the UECapabilityInformation message or E-UTRA capability information element.

The PS NAS messages NM1 and NM2 may be messages of an attach or routing area update procedure used in the NAS protocol for GPRS/combined GPRS service attaching or updating the currently-located routing area. For the attach procedure, the PS NAS messages NM1 and NM2 are an ATTACH ACCEPT message and an ATTACH COMPLETE message, respectively. For routing area update procedure, the PS NAS messages NM1 and NM2 are a ROUTING AREA UPDATE ACCEPT message and a ROUTING AREA UPDATE COMPLETE message, respectively. Please refer to FIGS. 6 and 7, which illustrate an example of the ATTACH COMPLETE message and the ROUTING AREA UPDATE COMPLETE message, respectively. In FIGS. 6 and 7, 'M' represents 'Mandatory'; 'O' represents 'Optional'; 'V' represents 'Value Only'; TLV represents 'Type-Length-Value'. A length field adopts an octet as a unit. The ATTACH COMPLETE/ROUTING AREA UPDATE COMPLETE message includes a protocol discriminator, a skip indicator, an attach complete message/routing area update complete message identity, an inter RAT handover information, and a UE Capability information IE, where the UE Capability information IE is the E-UTRA capability information. The usage of the protocol discriminator, the skip indicator, the identity, and the inter RAT handover information shall be well known in the art, and thus the detailed description is omitted.

For example, if a mobile device supporting the LTE RAT receives a NAS message including the predetermined bit in the Requested MS information IE, which is set to 1, the mobile device sends another NAS message including the E-UTRA radio access capability to the core network.

Please note that the abovementioned steps of the processes 30, 40 including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the example of the present invention, at the RRC level, transmits a LTE capability reporting message including the LTE capability information without including capability information of other RATs when the LTE capability reporting message needs to be transmitted in the non-LTE RAT. At the NAS level, the example of the present invention utilizes PS NAS messages to report the LTE capability only when the PS NAS message requesting the LTE RAT capability is received. Thus, unnecessary capability reporting is avoided.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reporting radio access technology, hereinafter called RAT, capability for a mobile device of a wireless communication system, the method comprising:

including capability information in a capability reporting message, wherein the capability information is only associated with a first RAT; and transmitting the capability reporting message to a network of a second RAT via the second RAT, comprising:

encapsulating the capability reporting message in a radio resource control message of a capability enquiring procedure; and transmitting the radio resource control message to the network;

wherein the first RAT is a long term evolution (LTE) RAT, and the second RAT is a non-LTE RAT;

wherein the radio resource control message is a UE CAPABILITY INFORMATION message of a RAT other than the LTE RAT or a RRC CONNECTION SETUP COMPLETE message of a RAT other than the LTE RAT;

wherein the capability reporting message is a UE evolved universal terrestrial radio access (E-UTRA) capability information element of the LTE RAT.

2. The method of claim 1 further comprising:

performing a handover from the second RAT to the first RAT; and sending capability information associated with a RAT other than the first RAT to a network of the first RAT when signaling indicating the RAT other than the first RAT is received from the network of the first RAT.

3. A method of reporting radio access technology, hereinafter called RAT, capability for a mobile device of a wireless communication system, the method comprising:

receiving a first non access stratum, hereinafter called NAS, message requesting capability of a first RAT via a second RAT; and sending a second NAS message including capability information associated with the first RAT via the second RAT in response to the first NAS message, where the first NAS message and the second NAS message belong to a packet switched domain;

wherein the first RAT is a long term evolution (LTE) RAT, and the second RAT is a non-LTE RAT;

wherein the first NAS message comprises a "Requested MS information" information element of a GPRS (General Packet Radio Service) RAT, and the "Requested MS information" information element includes a predetermined bit set to a predetermined value;

wherein the capability information associated with the first RAT comprises a UE E-UTRA capability information element of the LTE RAT.

4. The method of claim 3, wherein the predetermined bit is an I-RAT bit or one of three spare bits.

5. The method of claim 4, wherein the predetermined value is 1.

6. The method of claim 3, wherein the second NAS message is a ATTACH COMPLETE message when the first NAS message is a ATTACH ACCEPT message of a GPRS RAT, or is a ROUTING AREA UPDATE COMPLETE message when the first NAS message is a ROUTING AREA UPDATE ACCEPT message of a GPRS RAT.

7. A communication device of a wireless communication system for accurately reporting radio access technology, hereinafter called RAT, capability, the communication device comprising:

a processor for executing a program code; and a computer readable recording medium coupled to the processor for storing the program code; wherein the program code instructs the processor to perform the following steps:

including first capability information in a capability reporting message, wherein the first capability information is only associated with a first RAT; and transmitting the capability reporting message to a network of a second RAT via the second RAT, comprising:

encapsulating the capability reporting message in a radio resource control message of a capability enquiring procedure; and transmitting the radio resource control message to the network;

wherein the first RAT is a long term evolution (LTE) RAT, and the second RAT is a non-LTE RAT;

wherein the radio resource control message is a UE CAPABILITY INFORMATION message of a RAT other than the LTE RAT or a RRC CONNECTION SETUP COMPLETE message of a RAT other than the LTE RAT;

wherein the capability reporting message is a UE evolved universal terrestrial radio access (E-UTRA) capability information element of the LTE RAT.

8. The communication device of claim 7, wherein the program code further instructs the processor to perform the following step:

generating the capability reporting message when a capability enquiring procedure of the second RAT is initiated.

9. The communication device of claim 8, wherein the capability enquiring procedure is a UE capability information procedure or a radio resource control establishment procedure.

10. The communication device of claim 7, wherein the program code further instructs the processor to perform the following step:

including second capability information associated with a RAT other than the first RAT in the capability reporting message when signaling indicating the RAT other than the first RAT is received from the network.

11. The communication device of claim 7, wherein the program code further instructs the processor to perform the following steps:

performing a handover from the second RAT to the first RAT; and sending capability information associated with a RAT other than the first RAT to a network of the first RAT when signaling indicating the RAT other than the first RAT is received from the network of the first RAT.

12. A communication device of a wireless communication system for accurately reporting radio access technology, hereinafter called RAT, capability, the communication device comprising:

a processor for executing a program code; and a computer readable recording medium coupled to the processor for storing the program code; wherein the program code instructs the processor to perform the following steps:

receiving a first non access stratum, hereinafter called NAS, message requesting capability of a first RAT via a second RAT; and sending a second NAS message including capability information associated with the first RAT via the second RAT in response to the first NAS message, where the first NAS message and the second NAS message belong to a packet switched domain;

wherein the first RAT is a long term evolution (LTE) RAT, and the second RAT is a non-LTE RAT;

wherein the first NAS message comprises a "Requested MS information" information element of a GPRS (General Packet Radio Service) RAT, and the "Requested MS information" information element includes a predetermined bit set to a predetermined value;

wherein the capability information associated with the first RAT comprises a UE E-UTRA capability information element of the LTE RAT.

13. The communication device of claim 12, wherein the predetermined bit is an I-RAT bit or one of three spare bits.

14. The communication device of claim 13, wherein the predetermined value is 1.

15. The communication device of claim 12, wherein the second NAS message is a ATTACH COMPLETE message when the first NAS message is a ATTACH ACCEPT message of a GPRS (General Packet Radio Service) RAT, or is a ROUTING AREA UPDATE COMPLETE message when the first NAS message is a ROUTING AREA UPDATE ACCEPT message of a GPRS RAT.

16. The communication device of claim 12, wherein the second NAS message is a ATTACH COMPLETE message when the first NAS message is a ATTACH ACCEPT message of a GPRS RAT, or is a ROUTING AREA UPDATE COMPLETE message when the first NAS message is a ROUTING AREA UPDATE ACCEPT message of a GPRS RAT.

17. A method of receiving radio access technology, hereinafter called RAT, capability for a network device of a wireless communication system, the method comprising:
   transmitting a first non access stratum, hereinafter called NAS, message requesting capability of a first RAT via a second RAT, to a mobile device; and
   receiving a second NAS message including capability information associated with the first RAT via the second RAT in response to the first NAS message, from the mobile device, where the first NAS message and the second NAS message belong to a packet switched domain;
   wherein the first RAT is a long term evolution (LTE) RAT, and the second RAT is a non-LTE RAT;
   wherein the first NAS message comprises a "Requested MS information" information element of a GPRS (General Packet Radio Service) RAT, and the "Requested MS information" information element includes a predetermined bit set to a predetermined value;
   wherein the capability information associated with the first RAT comprises a UE E-UTRA capability information element of the LTE RAT.

18. The method of claim 17, wherein the predetermined bit is an I-RAT bit or one of three spare bits.

19. The method of claim 18, wherein the predetermined value is 1.

20. The method of claim 17, wherein the second NAS message is a ATTACH COMPLETE message when the first NAS message is a ATTACH ACCEPT message of a GPRS RAT, or is a ROUTING AREA UPDATE COMPLETE message when the first NAS message is a ROUTING AREA UPDATE ACCEPT message of a GPRS RAT.

21. A network device of a wireless communication system for receiving radio access technology, hereinafter called RAT, capability, from a mobile device, the network device comprising:
   a processor for executing a program code; and
   a computer readable recording medium coupled to the processor for storing the program code; wherein the program code instructs the processor to perform the following steps:
   transmitting a first non access stratum, hereinafter called NAS, message requesting capability of a first RAT via a second RAT, to a mobile device; and
   receiving a second NAS message including capability information associated with the first RAT via the second RAT in response to the first NAS message, from the mobile device, where the first NAS message and the second NAS message belong to a packet switched domain;
   wherein the first RAT is a long term evolution (LTE) RAT, and the second RAT is a non-LTE RAT;
   wherein the first NAS message comprises a "Requested MS information" information element of a GPRS (General Packet Radio Service) RAT, and the "Requested MS information" information element includes a predetermined bit set to a predetermined value;
   wherein the capability information associated with the first RAT comprises a UE E-UTRA capability information element of the LTE RAT.

22. The network device of claim 21, wherein the predetermined bit is an I-RAT bit or one of three spare bits.

23. The network device of claim 22, wherein the predetermined value is 1.

24. The network device of claim 21, wherein the second NAS message is a ATTACH COMPLETE message when the first NAS message is a ATTACH ACCEPT message of a GPRS (General Packet Radio Service) RAT, or is a ROUTING AREA UPDATE COMPLETE message when the first NAS message is a ROUTING AREA UPDATE ACCEPT message of a GPRS RAT.

* * * * *